United States Patent Office 3,065,012
Patented Nov. 20, 1962

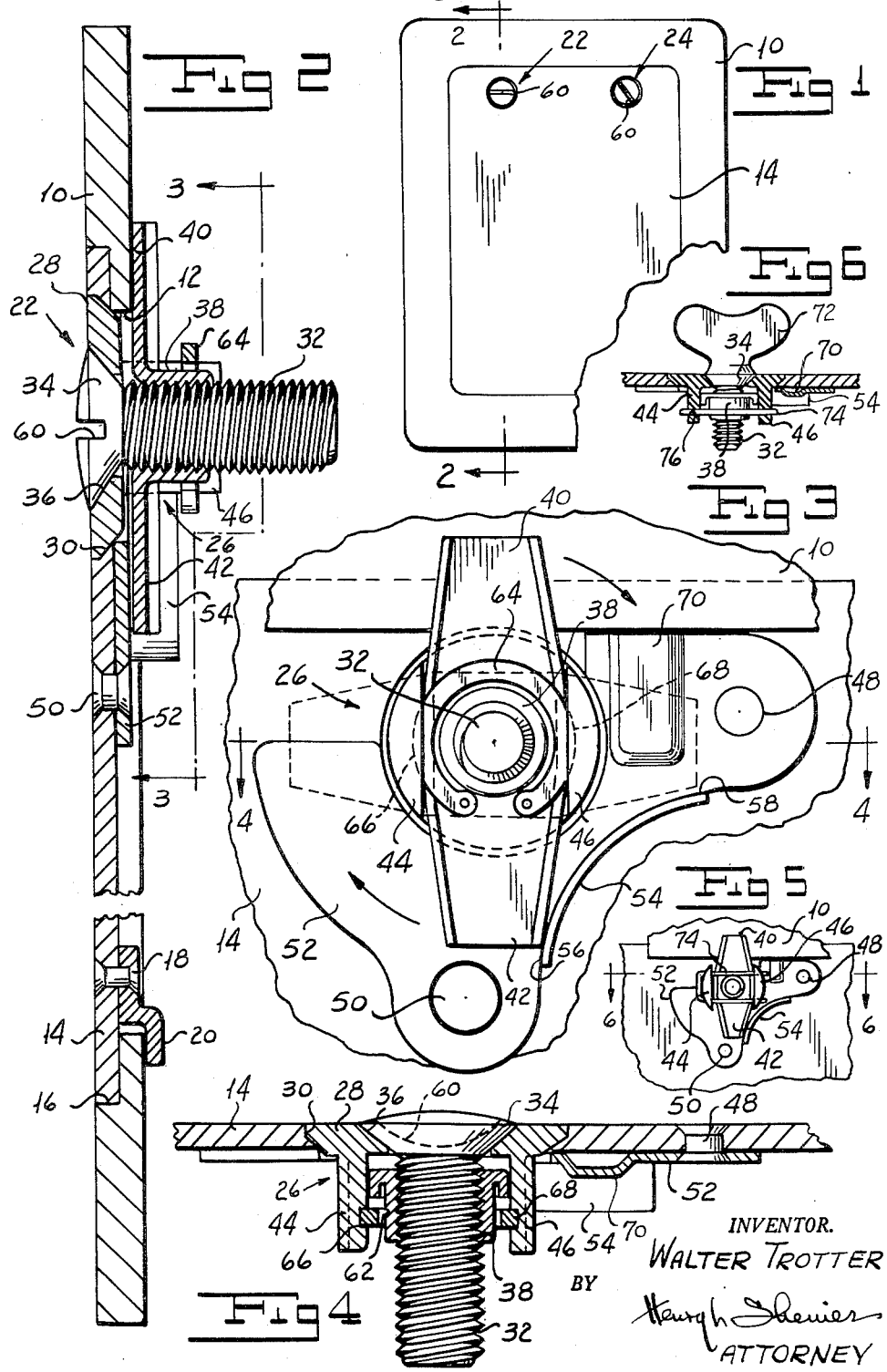

3,065,012
TIGHTENABLE ROTARY FASTENER
Walter Trotter, Fairlawn, N.J., assignor to Camloc Fastener Corporation, Paramus, N.J.
Filed Aug. 26, 1960, Ser. No. 52,230
6 Claims. (Cl. 292—212)

My invention relates to tightenable rotary fasteners and more particularly to an improved tightenable rotary fastener which is more certain in operation and thus safer than are fasteners of the prior art.

There are many instances in which it is necessary that an access opening be securely closed when not in use. This requirement is especially important in modern, high-speed aircraft in which the skin of the craft should be as smooth and as free of openings as is consistent with the necessity for providing access openings where required for use when the craft is being serviced or the like.

There are known in the prior art various devices for securing the doors of access openings in positions at which they close the openings in such manner as to present a relatively smooth outer surface. Most of these devices employ some form of latch member which engages the inside of the aircraft body or the like in which the access opening is provided. Since the space within the craft adjacent the opening is not usually accessible from inside the craft, it is desirable not only that the latch be actuated from outside the craft, but also that some means be provided for notifying the operator that the latching member is in the position in which it engages the portion of the body or frame surrounding the access opening.

In one particular form of fastener known in the art, an assembly of a screw and a nut carried by the screw is rotated as a unit to bring a stop member carried by the nut into engagement with a stop to position a latch member carried by the nut at a location at which it may engage the frame surrounding the access opening. Upon further rotation of the screw in the same direction, the nut moves axially of the screw to clamp the door tightly between the latch and the frame. To release the latch, the screw is rotated in the reverse direction first to cause the nut to rotate relative to the screw and to move axially along the screw to relieve the clamping pressure and then to rotate the nut with the screw through frictional engagement and to rotate the nut to a position at which its stop member engages a second stop to position the latch member at a location at which it does not engage the frame so that the door may be opened. A bushing which rotates with the nut extends to a location outside the door, and it carries a visual indicator for notifying the operator that the latch is in the proper position for clamping the door closed.

The fastener described above embodies a number of defects. In using the fastener of the prior art, it is possible to unthread the screw along the nut in the unfastening action to displace the nut with respect to the bushing so that the nut is displaced along the screw through a distance greater than the height of the stop member. Should this occur, the nut may ride over the stop member when the screw is being tightened. In such case, the screw will be tight, but the latch member will not be in a proper latching position. It would be expected in this case that the visual indicator would show that the latch member was not correctly positioned so that the latch could be unfastened and retightened correctly. While the visual indicator should provide such an indication, very often these fasteners must be secured in the dark so that the visual indication cannot be seen by the operator, and it does not accomplish its intended purpose. It also occurs that the fasteners are operated by careless employees who, feeling that the fastener is tightened, neglect to observe the visual indication that it is not properly in place. As a consequence of these defects, it may occur that the door opens at inopportune times with consequent danger to parts and to personnel. It will be appreciated further that where doors employing these latches are used to close aircraft access openings, it is possible that the door may fall free of the aircraft in flight with the resultant danger of injuring people on the ground below. At best, in case of the misoperation described above, where the operator does observe the indicator, he must take the trouble to release the fastener and resecure it in its correct position.

I have invented a tightenable rotary fastener which overcomes the defects of fasteners of the type pointed out hereinabove. I so arrange my fastener that the stop member is not permitted to ride onto the stop but is constrained to engage the side of the stop. Thus the possibility that the latch member of my fastener will not be in the proper position to engage the frame or body in which the access opening is provided is substantially eliminated. As a result of the arrangement of my fastener, it is not necessary to provide a visual indicator of the fact that the latch member is correctly positioned. That is, owing to the fact that the possibility of the latch member of my fastener may be secured in an incorrect position is substantially eliminated, I need not employ any visual indicator for showing that the latch member is properly positioned.

One object of my invention is to provide a tightenable rotary fastener which overcomes the defects of tightenable rotary fasteners of the prior art.

Another object of my invention is to provide a tightenable rotary fastener having means for preventing the nut stop member from riding up on top of the stop.

Still another object of my invention is to provide a tightenable rotary fastener in which the possibility of the latch member being secured in an incorrect position is substantially eliminated.

A further object of my invention is to provide a tightenable rotary fastener which does not require means for indicating that the latch member is in its correct latching position.

Other and further objects of my invention will appear from the following description.

In general my invention contemplates the provision of a tightenable rotary fastener of the type in which a screw is adapted to actuate a nut having a latch portion and a stop portion and carried by a bushing for rotation therewith. I provide my fastener with means for limiting the relative axial movement of the nut with respect to the bushing to prevent the stop portion of the nut from riding up on top of its associated stop to prevent the fastener from being tightened when the latch portion of the nut is not in the proper position to engage its latch keeper of the frame providing the access opening with which the fastener is associated, which frame may act as a latch keeper.

In the accompanying drawings which form part of the instant specification and which are to be read in conjunction therewith and in which like reference numerals are used to indicate like parts in the various views:

FIGURE 1 is a fragmentary front elevation of an access opening and its associated door with which my tightenable rotary fastener is used.

FIGURE 2 is a sectional view of the opening and door having my rotary tightenable fastener shown in FIGURE 1 taken along the line 2—2 of FIGURE 1 and drawn on an enlarged scale.

FIGURE 3 is a fragmentary rear elevation showing my tightenable rotary fastener taken along line 3—3 of FIGURE 2.

FIGURE 4 is a fragmentary sectional view of my tightenable rotary fastener taken along the line 4—4 of FIGURE 3.

FIGURE 5 is a fragmentary view showing an alternate form of my tightenable rotary fastener.

FIGURE 6 is a fragmentary sectional view of the alternate form of my tightenable rotary fastener taken along the line 6—6 of FIGURE 5.

Referring now to FIGURES 1 to 4 of the drawings, I have shown a frame or body 10 forming an access opening 12 of an aircraft or the like and adapted to be closed by a door 14. The door 14 fits into a rabbet 16 formed in the frame 10 around the opening 12. I employ any suitable means such, for example, as rivets 18 or the like for securing a retaining flange 20 to the inner surface of the door 14. When the door 14 is placed over the opening 12, flange 20 slides over the lower edge of the opening 12 to provide a connection between the door 14 and the lower edge of the opening. It will readily be appreciated by those skilled in the art that the retaining flange 20 could be replaced by a hinge or by any other suitable means for connecting the door 14 to the frame 10. In particular, by way of example and not by way of limitation, I have illustrated in FIGURES 1 to 4 an illustrative access opening provided in an aircraft in which the opening 12 ordinarily may have dimensions of four inches by six inches and in which the periphery of the door 14 fits into the recess 16 to form a smooth surface on the outside of the craft.

I provide the door 14 with a pair of my tightenable rotary fasteners indicated generally by the reference characters 22 and 24 for securing the door 14 in position over the opening 12. Since the fasteners 22 and 24 are substantially identical, I will describe only one of these fasteners in detail.

The fastener 22 includes a bushing, indicated generally by the reference character 26, having a head 28 which rides in a countersunk recess 30 in the door 14. I provide my fastener with a screw 32 having a head 34 adapted to engage a countersunk recess 36 provided in the bushing head 28 when the latch is in its secured position as will be described hereinafter. The screw 32 carries a nut 38 which in the particular embodiment shown includes a latch portion 40 and a stop portion 42. It is to be understood that while I have shown the nut 38 and its latch and stop portions 40 and 42 as being formed as an integral piece, I might form these members separately and mount them on the nut 38 for rotation therewith by any suitable means known to the art.

I form the bushing 26 with a pair of depending legs 44 and 46 extending downwardly from the head 28 on the two sides of the nut 38. These legs engage the nut to cause the nut 38 and the bushing 26 to rotate together and yet the nut to move axially of the bushing upon relative rotation of the screw with respect to the nut.

As can readily be seen by reference to FIGURE 3, I employ any suitable means such, for example, as rivets 48 and 50 to mount a plate 52 on the inner surface of the door 14. I form plate 52 with an arcuate flange 54 upstanding from the surface of the door 14 to provide a first or closed-position stop surface 56 and a second or open-position stop surface 58.

From the structure thus far described it will be apparent that with the latch portion 40 in engagement with the surface 58 in the broken line position of the nut and its associated portions shown in FIGURE 3, the door 14 may be placed in the recess 16 to cover the opening 12 by slipping the retaining flange 20 over the lower edge of the opening. When this has been done, the screw 32 may be turned in a counter clockwise direction as viewed in FIGURE 3 by inserting a suitable tool (not shown) in a slot 60 formed in the head 34. When this is done, the nut 38 moves with the screw until the stop portion 42 of the nut engages the surface 56. If desired, I may provide the nut 38 with one or more dimples 62 to ensure that the nut turns with the screw during this movement of the screw. When the stop portion 42 has thus been moved to a position at which it engages the surface 56, then the latch portion 40 of the nut is in a position at which it may engage the interior surface of the frame 10 providing the opening 12. Upon further rotation of the screw 32, since the stop portion 42 is in engagement with the surface 56, the nut can no longer rotate with the screw, but it moves axially relative to the screw in a direction to the left as viewed in FIGURE 2 securely to hold the door 14 in engagement with the frame 10. The frame or latch keeper will be clamped between the screw head 34 and the latch 40 through the bushing flange 28.

When the latch is being released, as the screw 32 turns in the opposite direction or in a clockwise direction as viewed in FIGURE 3 (shown by the arrows) the nut first moves slightly in a direction axially of the screw 32 to the right as viewed in FIGURE 2 until the clamping pressure is relieved. Upon further rotation of the screw in this direction, the nut moves with the screw until the latch portion 40 engages the second or open position of the stop surface 58, as indicated in broken lines in FIGURE 3. In this position of the nut the door may be opened.

As is explained hereinabove with respect to the fasteners of the prior art, if before the fastener is actuated to secure the door 14 in position over the opening 12, the nut has been backed off the screw to a certain distance, then, when the door is in place and an attempt is made to actuate the fastener, the stop portion 42 of the nut 38, rather than engaging the surface 56 of the stop member 54, may ride up onto the flange 54 and the latching portion 40 consequently may move to a position beyond that at which it can firmly engage the inside of the frame 10. In accordance with my invention, I provide my fastener with means for limiting the relative movement of the nut 38 with respect to the bushing 26 to prevent the action outlined above and thus ensure the fastener to be tightened in a position at which the latching portion 40 is securely in engagement with the inside of the frame 10. This means for limiting relative motion between the nut and the bushing may take various forms. In FIGURES 1 to 4 I have shown a snap ring 64 formed of resilient material and adapted to be snapped into a position between the legs 44 and 46 at which the periphery of the ring is within respective slots 66 and 68 in the legs 44 and 46. In this manner, a bridge is formed between the two legs 44 and 46 of the bushing. If the screw 32 is turned in a counterclockwise direction, as is viewed in FIGURE 1 or in a clockwise direction as viewed in FIGURE 3, the nut 38 moves to the right as viewed in FIGURE 2 until it engages the ring 64. When this occurs, upon further rotation of the screw in this direction it will merely back off with respect both to the nut and to the bushing. I so position the bridge formed by the ring 64 along the length of the legs 44 and 46 that the limit position of the nut in a direction to the right is viewed in FIGURE 2 or downward as is viewed in FIGURE 4 is such that in this position the stop portion 42 must engage the surface 56, and it cannot ride up on the top edge of the flange 54.

I provide the plate 52 with a boss 70 outstanding from the surface of the plate. When the assembly is in its secured position and as the screw 32 is moved in a counterclockwise direction as viewed in FIGURE 1 and a clockwise direction as viewed in FIGURE 3 to release the fastener, after the clamping pressure is relieved in a manner described hereinabove, then the nut and its latching portion 40 move with the screw. The height of the boss 70 is such that as the latch portion 40 moves out of its locking position, it frictionally engages the boss 70 in the course of its movement to engage the open-position stop surface 58. This frictional engagement of the latch portion with the boss 70 holds the latch portion 40 and the nut 38 in the open position thereby facilitating reassembly of the door 14 in position over the opening 12. That is, this boss 70 prevents the nut and bushing from loosely moving to the locked position before the door is assembled in the opening thus requiring the operator to hold them in the open position while he places the door in position.

Referring now to FIGURES 5 and 6, I have shown a modified form of my fastener in which I provide the head 34 of screw 32 with a thumb screw attachment 72 permitting the screw to be turned manually without the aid of a tool. In this form of my invention I provide an alternate means for limiting the relative movement of the nut with respect to the bushing. A generally U-shaped resilient member 74 has legs which are adapted to be passed through respective openings 76 formed in the legs 44 and 46. Preferably, this member 74 is formed from resilient stock so that its legs tend to diverge or converge before its assembly on the fastener. In this manner, the spring bridge member 74 will frictionally remain in place bridging the legs 44 and 46.

In assembling the form of my tightenable rotary fastener shown in FIGURES 1 to 4, I place the bushing 26 in the hole 30 formed in the door 14. I next place the nut 38 having the latch portion 40 and the stop portion 42 in position between the legs 44 and 46 of the bushing. When this has been done, I snap the ring 64 into position with portions of the ring engaging in the recesses 66 and 68. The assembly is now ready to receive the screw 32. When the parts have thus been assembled and it is desired to secure the door 14 over the opening 12, the flange 20 is slipped over the lower edge of the opening and the door is moved to its closed position. When this has been done, I rotate the screw 32 in a clockwise direction as viewed in FIGURE 1 which is a counterclockwise direction as viewed in FIGURE 3. First, the nut 38 moves with the screw until its stop portion 42 engages the surface 56 of the stop flange 54. When this occurs, the latch portion 40 is in position behind the interior surface of the frame 10. Upon continued rotation of the screw 32 in the same direction, the nut and the latch portion 40 carried thereby is drawn firmly against the inner surface of the frame 10 securely to hold the door in position over the opening. It will be noted that with my arrangement it is not required that any visual indication that the latch is in its correct position is necessary. When I desire to open the door, I turn the screw 32 in a counterclockwise direction as viewed in FIGURE 1 which is a clockwise direction as viewed in FIGURE 3. During the initial movement in this direction, the clamping pressure of the latch portion 40 is released. Upon continued rotation of the screw, the nut moves with the screw until latch portion 40 engages the open-position stop surface 58 which is the broken line position of the latch portion 40 shown in FIGURE 3. In this position of the nut 38 and its latch and stop portions 40 and 42, the door may be opened. The boss 70 is frictionally engaged by the latch portion 40 in this position of the nut 38 to retain the nut in this position to facilitate opening and reclosing of the door 14.

It will be remembered that as is explained hereinabove the screw 32 may be turned in the direction to release the fastener through a greater rotation than is necessary merely to release the door. In the course of this rotation of the screw, the nut 38 and its latch and stop portions 40 and 42 move to the right as viewed in FIGURE 2. The snap ring 64 or other member which provides a bridge between the legs 44 and 46 limits the movement of the nut in this direction to obviate the possibility that the stop portion 42 may ride up on the flange 54 as the fastener is again moved to its closed position thereby preventing the fastener from being secured in an incorrect position.

In assembling the form of my tightenable rotary fastener shown in FIGURES 5 and 6, I place the bushing 26 in position in the opening 30 and insert the nut 38 between the legs 44 and 46 in the manner described hereinabove in connection with the form of my invention shown in FIGURES 1 to 4. In order to limit the movement of the nut 38 in a direction axially of the screw 32, I pass the legs of the resilient U-shaped member 74 through the openings 76 in the legs 44 and 46 of the bushing. I may, if desired, bend or otherwise secure the ends of the legs to ensure that the member 74 does not work its way out of engagement with the legs 44 and 46. The operation of the form of my invention shown in FIGURES 5 and 6 is substantially the same as that of the form of my invention shown in FIGURES 1 to 4 with the exception that a thumb screw 72 is provided to permit manual operation of the fastener.

It will be seen that I have accomplished the objects of my invention. I have provided a tightenable rotary fastener which overcomes the defects of fasteners of the prior art. My fastener is adapted to secure a door or other covering firmly in position over an access opening or the like. My fastener is safer and more reliable than are fasteners of the prior art. I provide the fastener with means for preventing the fastener from being secured in a position in which a latch portion is not properly positioned to engage the access opening frame. My fastener does away with the necessity for providing a visual indication of the position of the latch portion of the fastener, and thus advantageously be employed in the dark and in areas where only the sense of touch can readily be employed.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A tightenable rotary fastener for securing a first member to a second member including in combination a latch, means mounting said latch on said first member for rotary movement about an axis and for movement along said axis, first interengageable stop means on said latch and on said first member for limiting rotary movement of said latch in one direction to a position at which said latch may engage said second member, said first interengageable means comprising a stop having a certain dimension in the direction of said axis, second interengageable stop means on said latch and on said first member for limiting rotary movement of said latch in the other direction to a position at which said latch is clear of said second member, means for moving said latch first to cause one of said stop means to operate and then to move said latch in the direction of said axis, means carried by said latch mounting means independently of said latch moving means for limiting movement of said latch axially of its mounting means in a direction away from said second member to a distance less than said certain dimension and means for releasably holding said latch in said position at which said second stop means are engaged.

2. A tightenable rotary fastener for securing a first member to a second member including in combination a bushing rotatably carried by said first member, a latch, means mounting said latch on said bushing for rotation therewith about an axis and for movement with respect thereto in the direction of said axis, interengageable stop means on said latch and on said first member for limiting rotary movement of said latch in one direction to a position at which said latch may engage said second member, said interengageable means comprising a stop having a certain dimension in the direction of said axis, means for moving said latch in said one direction first to cause said stop means to engage and then to cause said latch to move with respect to said bushing in the direction of said axis and means carried by said latch mounting means independently of said latch moving means for limiting movement of said latch axially of said bushing in a direction away from said second member to a distance less than said certain dimension.

3. A tightenable rotary fastener for securing a first member to a second member including in combination a bushing rotatably carried by said first member, a screw rotatably carried by said bushing, a nut carried by said screw, means for causing said nut to rotate with said bushing about an axis while permitting relative movement of said nut and said bushing in the direction of said axis, a latch carried by said nut for movement therewith, interengageable stop means carried by said latch and said first member for limiting rotary movement of said latch in one direction to a position at which said latch may engage said second member, said interengageable means comprising a stop having a certain dimension in the direction of said axis, said screw being adapted to be turned first to cause said stop means to engage and then to move said nut in the direction of said axis and means carried by said bushing for limiting movement of said nut axially of said bushing in a direction away from said second member to a distance less than said certain dimension from overriding said stop.

4. A tightenable rotary fastener for securing a first member to a second member including in combination a bushing rotatably carried by said first member, said bushing being provided with spaced legs, a screw rotatably carried by said bushing, a nut carried by said screw, said nut being disposed between said legs whereby said nut rotates with said bushing about an axis while being permitted to move relative to said bushing in the direction of said axis, a latch carried by said nut for movement therewith, interengageable stop means carried by said latch and said first member for limiting movement of said latch in one direction to a position at which said latch may engage said second member, said screw being adapted to be turned first to cause said stop means to engage and then to cause said nut to move with respect to said bushing in the direction of said axis and means forming a bridge extending between said legs for limiting relative movement of said nut axially of said bushing in a direction away from said second member.

5. A tightenable rotary fastener for securing a first member to a second member including in combination a bushing rotatably carried by said first member, said bushing being provided with spaced legs, a screw rotatably carried by said bushing, a nut carried by said screw, said nut being disposed between said legs whereby said nut rotates with said bushing about an axis while being permitted to move relative to said bushing in the direction of said axis, a latch carried by said nut for movement therewith, interengageable stop means carried by said latch and said first member for limiting movement of said latch in one direction to a position at which said latch may engage said second member, said screw being adapted to be turned first to cause said stop means to engage and then to cause said nut to move with respect to said bushing in the direction of said axis and a resilient ring disposed between said legs and in engagement therewith for limiting relative movement of said nut axially of said bushing in a direction away from said second member.

6. A tightenable rotary fastener for securing a first member to a second member including in combination a bushing rotatably carried by said first member, said bushing being provided with spaced legs, a screw rotatably carried by said bushing, a nut carried by said screw, said nut being disposed between said legs whereby said nut rotates with said bushing about an axis while being permitted to move relative to said bushing in the direction of said axis, a latch carried by said nut for movement therewith, interengagable stop means carried by said latch and said first member for limiting movement of said latch in one direction to a position at which said latch may engage said second member, said screw being adapted to be turned first to cause said stop means to engage and then to cause said nut to move with respect to said bushing in the direction of said axis and a U-shaped member having legs which extend across the space between the legs of said bushing for limiting relative movement of said nut axially of said bushing in a direction away from said second member.

References Cited in the file of this patent

UNITED STATES PATENTS

| | | |
|---|---|---|
| 1,219,217 | Arndt | Mar. 13, 1917 |
| 1,327,011 | Arndt | Jan. 6, 1920 |
| 1,876,237 | Jackson | Sept. 6, 1932 |
| 2,772,906 | Esmond | Dec. 4, 1956 |